3,484,393
FOAMABLE POLYMER COMPOSITION AND
PROCESS OF FOAMING SAME
George E. Ham, Leawood, Kans., assignor, by mesne assignments, to Gulf Oil Corporation, Pittsburgh, Pa., a corporation of Pennsylvania
No Drawing. Original application Mar. 12, 1962, Ser. No. 179,219. Divided and this application Mar. 21, 1966, Ser. No. 578,918
Int. Cl. C08f 47/10
U.S. Cl. 260—2.5                                      18 Claims

ABSTRACT OF THE DISCLOSURE

This invention relates to a foamable poylmer composition consisting essentially of one hundred parts by weight of a thermoplastic polymer and about 0.5–10 parts by weight of a foaming agent of the formula:

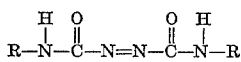

where R is selected from the group consisting of an alkyl group, α-cycloalkyl group, an aryl group, an alkaryl group, and an aralkyl group, with the further limitation that R contains a total of 1–10 carbon atoms.

---

This application is a division of Ser. No. 179,219 filed Mar. 12, 1962, now abandoned.

This invention relates to formable thermoplastic polymer compositions, to methods of foaming such foamable thermoplastic polymer compositions, to foamed thermoplastic polymers prepared therefrom, and to electric conductors insulated with a coating of such foamed thermoplastic polymers.

Foamable thermoplastic polymer compositions and the foamed thermoplastic polymers prepared therefrom are known in the art. One such class of foamable polymer compositions consists of a thermoplastic polymer, typically polyethylene, having incorporated therein azodicarbonamide as a blowing agent. The foamable polymer compositions containing azodicarbonamide as a foaming agent, while having many desirable properties, are known to be subject to certain shortcomings. In the first instance, azodicarbonamide does not start decomposing until it reaches a temperature of approximately 200° C. Such temperatures are undesirably high for many purposes, particularly where the foamed resins, are to be prepared by extrusion processes. While it is known that the decomposition temperature of azodicarbonamide can be lowered somewhat by incorporating certain promoters in the foamable polymer compositions, such promoters are usually of an ionic type and adversely affect the electrical insulating properties of the resulting foamed polymer. Secondly, the foamed polymers that have been foamed with azodicarbonamide have a tendency to absorb water from the atmosphere and this in turn adversely affects the electrical insulating properties of the foamed polymers. It obviously would be desirable to have available to the art foamable polymer compositions having the desirable characteristics associated with foamable polymer compositions containing azodicarbonamide, but which compositions in addition would foam at lower temperatures and provide foamed polymers having superior electrical insulating properties.

It is an object of this invention to provide novel foamable thermoplastic polymer compositions.

Another object of the invention is to provide novel foamable thermoplastic polymer compositions which can be foamed at relatively low temperatures and which provide foamed thermoplastic polymers having good electrical insulating properties which are retained even after prolonged exposure to humid atmospheric conditions.

Other objects and advantages of the invention will be apparent from the following detailed description thereof.

The above and related objects are attained by providing foamable thermoplastic polymer compositions which consist essentially of one hundred parts by weight of a thermoplastic polymer and about 0.5–10 parts by weight of a foaming agent of the formula:

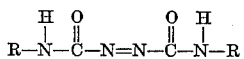

where R in the above formula is selected from the group consisting of an alkyl group, a cycloalkyl group, an aryl group, an alkaryl group, and an aralkyl group, with the further limitation that R contains a total of 1–10 carbon atoms. These foamable polymer compositions, when foamed, provide foamed thermoplastic polymers having excellent physical properties and excellent electrical insulating properties.

The following examples are set forth to illustrate more clearly the principle and practice of the invention to those skilled in the art. Where parts or quantities are mentioned, they are parts or quantities by weight.

EXAMPLE I

One hundred parts of polyethylene particles (approximately ⅛-inch in diameter) are blended with two parts of N,N′-di(t-butyl)azodicarbonamide. The dry ingredients are mixed together in a drum tumbler which is rotated for twenty minutes at 45 r.p.m. The polyethylene employed has a density of about 0.916, a melt index of 22, a number average molecular weight of about 13,500, and a weight average molecular weight of about 125,000. The polyethylene also contains 100 p.p.m. by weight of Ionol[1] as an antioxidant. The resulting composition is extruded through a sheet die at a die temperature of about 180° C. to provide a foamed polyethylene sheet about 250 mils thick. The foamed polymer has a density of about 5 lbs./ft.$^3$ and a fine uniform cell size. The foamed polymer has a dielectric constant (measured at $10^9$ c.p.s.) of about 1.05 and a dissipation factor (measured at $10^9$ c.p.s.) of about 0.0002.

Additional experiments demonstrate that a foamed polyethylene having essentially comparable properties can be obtained by extruding the composition at die temperatures as low as 160° C.

EXAMPLE II

Example I is repeated except that the N,N′-di(t-butyl) azodicarbonamide is replaced with an equal weight of N,N′-diisopropylazodicarbonamide. Comparable results are obtained.

EXAMPLE III

Example I is repeated except that the N,N′-di(t-butyl) azodicarbonamide is replaced with an equal weight of N,N′-dicyclohexylazodicarbonamide. The foamed polyethylene resin thus obtained has a density of about 8 lbs./ft.$^3$. By increasing the concentration of the foaming agent to three parts and increasing the die temperature to 200° C., it is possible to obtain a foamed polyethylene having properties comparable to the product obtained in Example I.

EXAMPLE IV

To prepare a control foamed polyethylene sheet, Example I is repeated except that the N,N′-di(t-butyl) azodicarbonamide is replaced with an equal weight of azodicarbonamide. In addition, the die temperature is ---
[1] Registered trademark of the Shell Chemical Company.

increased to 220° C. The characteristics of the foamed polyethylene obtained are generally comparable to the foamed polyethylenes obtained in Examples I, II, and III, except that the density is somewhat higher and the foamed resin has a somewhat more heterogeneous cell structure.

EXAMPLE V

Aliquots of the foamed polyethylene sheets prepared in Examples I–IV are stored for twenty-eight days in an atmosphere maintained at 50° C. and seventy-five percent relative humidity. The electrical resistance of the samples is measured at the end of one, two, three, four, seven, fourteen, twenty-one and twenty-eight days. The electrical resistance of the foamed polyethylene sheets prepared in Examples I–III undergoes no substantial change. This observation demonstrates that these polyethylene resins do not absorb water so as to change their electrical insulating properties. By way of contrast, the foamed polyethylene sheet prepared in Example IV undergoes a change in which the electrical resistance of the foamed polyethylene resin decreases with the time spent in the high humidity atmosphere. This observation suggests that this foamed polyethylene resin absorbs moisture from the atmosphere. In any event, exposure to moisture adversely affects the electrical insulating properties of the control foamed polyethylene.

EXAMPLES VI–XVII

One hundred parts of the polyethylene particles described in Example I are blended with three parts of each of the foaming agents set forth in Table I:

Table I

| Example: | Foaming agent |
|---|---|
| VI | N,N'-dimethylazodicarbonamide. |
| VII | N,N'-diethylazodicarbonamide. |
| VIII | N,N'-di(n-propyl)azodicarbonamide. |
| IX | N,N'-di(n-butyl)azodicarbonamide. |
| X | N,N'-di(s-butyl)azodicarbonamide. |
| XI | N,N'-di(n-amyl)azodicarbonamide. |
| XII | N,N'-di(isoamyl)azodicarbonamide. |
| XIII | N,N'-di(n-hexyl)azodicarbonamide. |
| XIV | N,N'-di(2-ethylhexyl)azodicarbonamide. |
| XV | N,N'-di(n-decyl)azodicarbonamide. |
| XVI | N,N'-diphenylazodicarbonamide. |
| XVII | N,N'-dibenzylazodicarbonamide. |

Each of the compositions can be extruded at die temperatures in the range of 160–220° C. to prepare foamed polyethylenes having a density of less than about 10 lbs./ft.$^3$.

EXAMPLE XVIII

Part A

One hundred parts of polypropylene particles (approximately ⅛-inch in diameter) and three parts of N,N'-di(t-butyl)azodicarbonamide are intimately admixed as described in Example I. The polypropylene employed is highly isotactic, has a density of about 0.925, and a melt index of about 4.0. The polypropylene contains 100 p.p.m. by weight of Ionol[2] as an antioxidant. The foamable polymer composition is extrusion coated at a die temperature of about 200° C. onto No. 12 copper wire employing a conventional cross-head extruder die to provide a coated wire having a diameter of about 0.25 inch. The foamed polypropylene coating has a density of about 12 lbs./ft.$^3$ and excellent electrical insulating properties.

Part B

An aliquot of the foamed polypropylene insulated wire from Part A above is maintained for five days in a circulating air oven at a temperature of about 100° C. At the end of the test period, the physical properties of the foamed polypropylene are comparable to the physical properties of the foamed polypropylene as originally prepared. This observation indicates that the foamed polypropylene is not seriously damaged by being maintained at an elevated temperature in an oxygen atmosphere in the presence of the copper wire. This observation is both surprising and of substantial practical importance as polypropylene is normally severely damaged by oxygen when maintained in contact with copper. This is true even when the polypropylene resin contains a good stabilizer such as a hindered phenol, e.g., Ionol[3]. It is probable that the decomposition product of the foaming agent, i.e., N,N'-di(t-butyl)oxamide, functions as a stabilizer in the polypropylene resin, possibly in cooperation with the hindered phenol antioxidant.

EXAMPLE XIX

One hundred parts of a styrene homopolymer having a Staudinger molecular weight in the range of 50,000–80,000 is intimately admixed with three parts of N,N'-di(t-butyl) azodicarbonamide as previously described. This composition can be blow extruded at a die temperature of about 160° C. employing conventional blow extrusion equipment to provide a thin foamed polystyrene film having a density of less than 10 lbs./ft.$^3$. The resulting film can be laminated to paper for fabrication into disposable hot drink cups.

EXAMPLE XX

Example XIX is repeated except that the styrene homopolymer is replaced with a nylon-6 polymer and the die temperature is increased to about 230° C.

EXAMPLE XXI

A vinyl chloride plastisol is prepared by dispersing one hundred parts of plastisol grade vinyl chloride homopolymer in fifty parts of di(2-ethylhexyl) phthalate. The resulting plastisol is stabilized in accordance with the resin manufacturer's recommendations and four parts of N,N'-dicyclohexylazodicarbonamide are uniformly incorporated therein. A five mil film of the formulated plastisol is knife coated onto a cotton textile fabric and passed through an oven maintained at 225° C. to foam the plastisol. The resulting laminate is suitable for use as a thermal insulating liner for hunting jackets and the like.

The thermoplastic polymer component of the compositions of the invention can be virtually any of the thermoplastic polymers known to the art. Such polymers will have molecular weights in the range such that they can be processed by conventional processing techniques, usually above 10,000. Typical examples of such resins include (1) the styrene polymers, e.g., styrene homopolymers, styrene copolymers having polymerized therein fifty percent or more of styrene with such comonomers as the acrylate and methacrylate esters, acrylonitrile, and the like, including the so-called impact styrene polymers in which at least a portion of the styrene is graft copolymerized upon a rubbery diene substrate and paticularly the so-called ABS graft copolymers, and (2) vinyl chloride polymers, e.g., vinyl chloride homopolymers, vinyl chloride copolymers having polymerized therein at least fifty percent vinyl chloride with such comonomers as vinyl acetate, vinylidine chloride, esters of fumaric and maleic acid, acrylate and methacrylate esters, et cetera. Other suitable thermoplastic resins that can be employed in the invention include the diene rubbers, both natural and synthetic, the acrylate ester polymers, the methacrylate ester polymers, nylon-6, nylon 6,6, the polycarbonates, the newer formaldehyde polymers as exemplified by Delrin[4], et cetera.

---

[2] Registered trademark of the Shell Chemical Company.
[3] Registered trademark of the Shell Chemical Company.
[4] Registered trademark of E. I. du Pont Company.

The preferred thermoplastic polymers to be employed in the compositions of the invention are thermoplastic polymers of a 2–4 carbon atom aplha olefin, i.e., ethylene, propylene, and butene-1. The olefin polymer can be a homopolymer of any one of the olefin species set forth above or can be a copolymer derived solely from these olefins, such as an ethylene-propylene copolymer. The olefin copolymers also can be copolymers having polymerized therein at least fifty weight percent of an alpha olefin with up to fifty weight percent of a vinylidine monoer copolymerizable therewith. Typical examples of suitable comonomers include the vinyl halides such as vinyl chloride, conjugated 1,3-diolefins such as butadiene and isoprene, vinyl esters of monobasic organic acids such as vinyl acetate, vinyl benzoate, and vinyl stearate, esters, amides, and nitriles of alpha, beta-ethylenically unsaturated monobasic acids, such as the methyl, ethyl, and octyl acrylates, the corresponding esters of methacrylic acid, acrylonitrile, methacrylonitrile, acrylamide, and methacrylamide, et cetera.

The blowing agent component of the compositions of the invention will conform to the structural formula set forth in the sixth paragraph of this specification. Certain of the blowing agents set forth are known compounds and any of the compounds meeting the requirements of the structural formula can be prepared by classical methods reported in the literature.

Certain of the species of the blowing agents employed in the practice of the invention are believed to be new chemical compounds. In particular, N,N'-diisopropylazodicarbonamide, N,N'-di(t-butyl)azodicarbonamide and N,N'-dicyclohexyl azodicarbonamide are believed to be new compositions of matter and are the preferred species of blowing agents to be employed in the practice of the invention.

N,N'-di(t-butyl) azodicarbonamide has especially outstanding properties in that the foamable polymer compositions containing this blowing agent can be fabricated into foamed polymers at unusually low temperatures. In addition, the density of the foamed polymers prepared therefrom are lower than would be expected. It is believed that the decomposition of this particular blowing agent liberates not only nitrogen, but also other gaseous products of utility in foaming.

When heated to 180° C., N,N'-di(t-butyl) azodicarbonamide will liberate 177 ml. of gas (STP)/gram in twenty minutes, whereas by way of contrast azodicarbonamide itself will liberate only 154 ml. of gas (STP)/gram in thiry-four minutes.

In addition to the thermoplastic polymer and the blowing agent, the foamable compositions of the invention also can include additional components such as pigments, fillers, plasticizers, colorants, stabilizers, lubricants, and the like. It has been observed that the cell size of the foamed resin can in some cases be reduced by incorporating in the foamable compositions a finely divided inorganic silicon containing material such as silicon dioxide, calcium silicate, diatomaceous earth, and the like. Such inorganic silicon materials should preferably have a particle size of less than about five microns and more especially less than about one micron. In addition, the incorporation of di- and trivalent metal salts of fatty acids containing eight or more carbon atoms into the compositions of the invention can under some circumstances have the beneficial effect of reducing the cell size of the foamed polymer. Typical examples of such salts include the barium, magnesium, aluminum, calcium, and zinc salts of such acids as octanoic acid, palmitic acid, hydroxystearic acid, erucic acid, et cetera.

In preparing the compositions of the invention, the blowing agent and additional components, if any, can be dispersed homogeneously throughout the polymer matrix by mixing the materials together on plastics working equipment such as mill rolls, Banbury mixers, and the like. In carrying out such processes, care should be exercised to maintain the mixing temperature below the decomposition temperature of the blowing agent. In most instances this temperature will be somewhat above 100° C. An important feature of the invention resides in the fact that it is not necessary to physically disperse the blowing agent throughout the resin when the composition is to be foamed by extrusion techniques. It is only necessary to prepare an intimate admixture of the thermoplastic resin and the blowing agent. Such mixing can be performed in dry tumblers, ball mills, and the like.

The foamable compositions can be foamed by employing any of the conventional foaming procedures known in the art, as for example by simply heating the polymer having the blowing agent dispersed therethrough in a sealed mold. Preferably, however, the foamable compositions are foamed by extruding the foamable compositions through conventional screw extruders. Where extrusion techniques are employed, the compositions should be extruded at a die temperature of above about 150° C. and preferably a die temperature in the range of about 160–250° C., and more especially about 160–225° C. As will be obvious to those skilled in the art, the precise die temperature employed will be somewhat dependent upon the particular thermoplastic polymer employed. The foamed polymers can be extruded through dies of any desired configuration to prepare foamed polymer sheets, films, rods, tubes, and the like. A particular utility of the invention resides in extruding the foamable polymer compositions, particularly a foamable olefin polymer composition, onto electrical conductors to prepare conductors carrying an insulating jacket of the foamed polymer.

As noted in the examples, the foamed polymers produced by the invention have excellent electrical insulating properties. Of particular importance is the observation that the electrical insulating properties are not significantly affected by prolonged exposure to humid atmospheric conditions. A further significant characteristic of the foamed polypropylene polymers produced by the invention is that they appear to be stabilized against the attack of oxygen and/or ozone when maintained in contact with copper. This is particularly significant in that it is recognized in the art that polypropylene is normally particularly susceptible to the attack of oxygen and/or ozone when in contact with copper. In preparing such foamed polypropylene polymers for use in contact with copper, it ordinarily will be preferred to also incorporate in the polypropylene a hindered phenol type antioxidant such as 6,6'-di(t-butyl) - 4,4' - bis-o-cresol, 5-n-pentadecyl resorcinol, 4,4'-thiobis(3-methyl - 6 - t-butylphenol), 4,4-methylene bis(3-methyl-6-t-butyl phenol), and 2,6-di(t-butyl)-4-methyl phenol. It is possible that the decomposition product(s) of the blowing agent, i.e., the corresponding N,N'-di substituted oxamide, synergistically coact with the hindered phenol to stabilize the polypropylene.

The above descriptions and particularly the examples are set forth for purposes of illustration only. Many modifications and variations thereof will be apparent to those skilled in the art and can be made without departing from the spirit and scope of the invention herein described.

What is claimed is:
1. A foamable polymer composition consisting essentially of one hundred parts by weight of a thermoplastic polymer and about 0.5–10 parts by weight of a foaming agent of the formula:

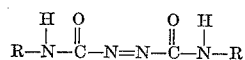

where R is selected from the group consisting of an alkyl group, a cycloalkyl group, an aryl group, an alkaryl group, and an aralkyl group, with the further limitation that R contains a total of 1–10 carbon atoms.

2. A foamable polymer composition of claim 1 in which the thermoplastic polymer is a polymer of a 2–4 carbon atom alpha olefin having polymerized therein at least fifty percent by weight of said alpha olefin.

3. A foamable polymer composition of claim 2 in which the thermoplastic polymer is a homopolymer of ethylene.

4. A foamable polymer composition of claim 2 in which the thermoplastic polymer is a homopolymer of propylene.

5. A foamable polymer composition of claim 1 in which the thermoplastic polymer is a polymer of styrene having polymerized therein at least fifty percent by weight of styrene.

6. A foamable polymer composition of claim 1 in which the thermoplastic polymer is a polymer of vinyl chloride having polymerized therein at least fifty percent by weight of vinyl chloride.

7. A foamable polymer composition of claim 6 wherein the composition contains a plasticizer for the vinyl chloride polymer.

8. A foamable polymer composition of claim 2 in which the foaming agent is an N,N'-dialkylazodicarbonamide.

9. A foamable polymer composition of claim 8 in which the foaming agent is N,N'-diisopropylazodicarbonamide.

10. A foamable polymer composition of claim 8 in which the foaming agent is N,N'-di(t-butyl)azodicarbonamide.

11. A foamable resin composition of claim 2 in which the foaming agent is N,N'-dicyclohexylazodicarbonamide.

12. A foamable polymer composition consisting essentially of an intimate physical admixture of one hundred parts by weight of a thermoplastic olefin polymer and about 0.5–10 parts by weight of a foaming agent of the formula:

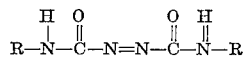

where R is selected from the group consisting of an alkyl group, a cycloalkyl group, an aryl group, an alkaryl group, and an aralkyl group, with the further limitation that R contains a total of 1–10 carbon atoms; said thermoplastic olefin polymer being a polymer of a 2–4 carbon atom alpha olefin and having polymerized therein at least fifty percent by weight of said alpha olefin.

13. A process for preparing a foamed thermoplastic polymer which comprises extruding a composition of claim 1 at a die temperature of at least about 150° C.

14. A process for preparing an insulated electric conductor which comprises extruding onto a metal wire at a die temperature of at least about 150° C. a composition of claim 1.

15. The foamable polymer composition of claim 3 wherein the foaming agent is N,N'-di(t-butyl)azodicarbonamide.

16. The foamable polymer composition of claim 3 wherein the foaming agent is N,N'-di(cyclohexyl)azodicarbonamide.

17. A foamable polymer composition consisting essentially of 100 parts by weight of a thermoplastic polymer and about 0.5–10 parts by weight of a foaming agent selected from the group consisting of N,N'-di(t-butyl) azodicarbonamide,
N,N'-diisopropyl azodicarbonamide,
N,N'-dicyclohexyl azodicarbonamide,
N,N'-dimethylazodicarbonamide,
N,N'-diethylazodicarbonamide,
N,N'-di(n-propyl) azodicarbonamide,
N,N'-di(n-butyl) azodicarbonamide,
N,N'-di(s-butyl)azodicarbonamide,
N,N'-di(n-amyl) azodicarbonamide,
N,N'-di(isoamyl)azodicarbonamide,
N,N'-di(n-hexyl) azodicarbonamide,
N,N'-di(2-ethylhexyl) azodicarbonamide,
N,N'-diphenylazodicarbonamide,
N,N'-dibenzylazodicarbonamide.

18. A foamable polymer composition consisting essentially of an intimate physical admixture of 100 parts by weight of a thermoplastic olefin polymer and about 0.5–10 parts by weight of a foaming agent selected from the group consisting of N,N'-di(t-butyl) azodicarbonamide,
N,N'-diisopropylazodicarbonamide,
N,N'-dicyclohexylazodicarbonamide,
N,N'-dimethylazodicarbonamide,
N,N'-diethylazodicarbonamide,
N,N'-di(n-propyl) azodicarbonamide,
N,N'-di(n-butyl) azodicarbonamide,
N,N'-di(s-butyl) azodicarbonamide,
N,N'-di(n-amyl) azodicarbonamide,
N,N'-di(isoamyl) azodicarbonamide,
N,N'-di(n-hexyl) azodicarbonamide,
N,N'-di(2-ethylhexyl) azodicarbonamide,
N,N'-diphenylazodicarbonamide,
N,N'-dibenzylazodicarbonamide;

said thermoplastic olefin polymer being a polymer of a 2–4 carbon atom α-olefin and having polymerized therein at least 50 percent by weight of said α-olefin.

References Cited

UNITED STATES PATENTS

| | | | |
|---|---|---|---|
| 3,017,406 | 1/1962 | Mehr | 260—2.5 |
| 3,072,972 | 1/1963 | Yokese et al. | 260—2.5 |

SAMUEL H. BLECH, Primary Examiner

M. FOELAK, Assistant Examiner

U.S. Cl. X.R.

260—31.8, 45.9, 192